United States Patent [19]

Goutzoulis et al.

[11] Patent Number: 5,125,051
[45] Date of Patent: Jun. 23, 1992

[54] WAVELENGTH-CODED BINARY FIBEROPTIC DELAY LINE APPARATUS FOR TIME STEERING OF ARRAY ANTENNAS

[75] Inventors: Anastasios P. Goutzoulis; David K. Davies, both of Pittsburgh, Pa.

[73] Assignee: The United States of America as represented by the Secretary of the Air Force, Washington, D.C.

[21] Appl. No.: 691,585

[22] Filed: Apr. 24, 1991

[51] Int. Cl.$^5$ .............................................. G02B 6/28
[52] U.S. Cl. ................................................... 385/27
[58] Field of Search ............... 350/96.16, 96.15; 343/777

[56] References Cited

U.S. PATENT DOCUMENTS

| | | | |
|---|---|---|---|
| 3,368,202 | 2/1968 | Crousel | 340/172.5 |
| 4,028,702 | 6/1977 | Levine | 343/100 SA |
| 4,671,604 | 6/1987 | Soref | 350/96.15 |
| 4,671,605 | 6/1987 | Soref | 350/96.15 |
| 4,714,314 | 12/1987 | Yang et al. | 350/96.20 |
| 4,725,844 | 2/1988 | Goodwin et al. | 342/374 |
| 4,814,773 | 3/1989 | Wechsberg et al. | 342/368 |
| 4,814,774 | 3/1989 | Herczfeld | 342/372 |
| 4,832,433 | 5/1989 | de La Chapelle | 350/96.15 |

Primary Examiner—William L. Sikes
Assistant Examiner—Robert E. Wise
Attorney, Agent, or Firm—William Stepanishen; Donald J. Singer

[57] ABSTRACT

A wavelength-coded binary fiberoptic delay line apparatus for time steering of array antennas having a plurality of delay line units serially connected to each other to provide a plurality of delay signals. Signal detecting/converting units which are connected respectively between adjacent delay line units wavelength-code the delay signals passing between the delay line units. The input signal to each delay line unit is separated into two signals one of which is connected to the output of that delay line unit.

5 Claims, 1 Drawing Sheet

WAVELENGTH-CODED BINARY FIBEROPTIC DELAY LINE APPARATUS FOR TIME STEERING OF ARRAY ANTENNAS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to an optical delay line apparatus and, more particularly, to a recirculating binary fiberoptic delay line apparatus for time steering of array antennas.

The state of the art of optical delay line apparatus is well represented and alleviated to some degree by the prior art apparatus and approaches which are contained in the following U.S. Pat. Nos.:

U.S. Pat. No. 3,368,202 issued to Crousel on Feb. 6, 1968;
U.S Pat. No. 4,671,604 issued to Soref on Jun. 9, 1987;
U.S. Pat. No. 4,671,605 issued to Soref on Jun. 9, 1987;
U.S. Pat. No. 4,714,314 issued to Yang et al on Dec. 22, 1987;
U.S. Pat. No. 4,725,844 issued to Goodwin et al on Feb. 16, 1988;
U.S. Pat. No. 4,814,773 issued to Wechsberg et al on Mar. 21, 1989;
U.S. Pat. No. 4,814,774 issued to Herczfeld on Mar. 21, 1989; and
U.S. Pat. No. 4,832,433 issued to de La Chapelle et al on May 23, 1989.

The Crousel patent is directed to a memory core matrix and simple delay means like magnetic drum apparatus or sonic delay lines in place of the complicated interconnection network, summation equipment and shift registers which are employed in a multibeam receiving system.

The Soref patent (604) describes a wavelength dependent, tunable, optical time delay system for electrical signals having a conversion/tuning unit for converting an incoming electrical signal into an optical signal as well as selectively varying the wavelength of the optical signal. By selectively varying the wavelength of the optical signal, the electrical signal can effectively and rapidly time delayed as desired in response to the electronic signal.

The Soref patent (605) is directed to a length dependent, optical time delay/filter device for electrical signals made up of a plurality of optical fibers of varying lengths. Depending upon which fibers an optical signal (converted from an incoming electrical signal) passes through determines the time of travel of the optical signal through the device, and as a result thereof is time delayed.

The Yang et al patent discloses a mode dependent, optical time delay system for electrical signals having a highly multi-mode optical fiber having a step index profile in optical alignment with an optical source which is capable of converting an incoming electrical signal into an optical signal.

The Goodwin et al patent discusses a technique for applying selected phase delays to an optical carrier signal, the phase delays being referenced to a radio-frequency (rf) subcarrier signal. The optical signal to be phase delayed is introduced into a phase delay network comprising multiple optical paths and multiple electro-optical switches, controllable by signals generated in switching logic. The selected delays can be introduced for purposes of data modulation, or for steering an antenna beam in a phased-array antenna.

The Wechsberg et al patent describes a fiber optic feed network for a radar which couples the antenna with the transmitting and receiving circuitry. The feed system includes a set of optical multiplexers interconnected by sets of optical fibers. Microwave energy of the radar is converted to optical radiation for communication to the antenna, and then converted back to the microwave energy.

The Herczfeld patent discloses an optically controlled phased array antenna system and method of operating same utilizing fiber optic transmission lengths and controlled piezo-electric crystals or equivalent elements to introduce predetermined time delays into each light signal by controlling the respective length of each fiber optic link. The light carrying fibers are wrapped around the respective crystals in accordance with a pattern to introduce time delays corresponding to the amount of stretch given to the fiber by the energized crystals. Beam scanning is achieved by controlling the matrix of crystals to introduce appropriate time delays into the optical signals which drive the respective antenna elements.

The de La Chapelle et al patent is directed to a fiber-optic feed network using series/parallel connected light emitting optic-electronic components, such as laser diodes for distributing RF, microwave, MMW, digital signals, and pulse modulated light. The diodes are selected in number and impedance to provide a good wideband impedance match to the RF/microwave/MMW/digital driving source.

Much effort has been devoted for the development of efficient fiberoptic delay line architectures that can provide a programmable delay over a wide range of delays. The most efficient such architecture is the binary programmable fiberoptic delay line (BIFODEL). In the binary programmable fiberoptic delay line the microwave signal to be delayed, linearly modulates the intensity of a laser diode. The resultant optical signal, is then routed through M fiber segments. Each fiber segment has a length that is equal to twice the length of its right neighbor. The length of the smallest or rightmost fiber segment is such that the delay which it introduces corresponds to the desired delay resolution $T_o$. Selection of the fiber segments, through which the signal is routed, can be achieved by means of M 2×2 optical switches. Each switch allows the signal to enter or to bypass a specific fiber segment. Thus, by selecting the states of the switches, a delay T may take any value (in increments of $T_o$) that is equal to or less than the maximum value which is equal to $$T_{max} = (2^M - 1)T_o \qquad (1.0)$$

After the signal has been routed through the proper fiber segments, it is detected and subsequently buffered and further processed. It may be noted that the importance of the binary programmable fiberoptic delay line comes because the total number of delays that can be generated is equal to $2^M$, and thus, with a small number of fiber segments, a very large number of delays can be generated, e.g., for M=10 we have 1024 possible delays. Note we have demonstrated (at the RaD Center) a prototype binary programmable fiberoptic delay line that operates with M=8 and over the 500-1000 MHz band.

In a one dimensional antenna array with K elements, the maximum time delay required by the eth element is given by $$T_{imax} = d_i \sin\theta_M / c. \quad (1.1)$$

where $d_i$ is the distance of the ith element from the 0th or reference element, c is the speed of light and $\theta_M$ is the maximum angle (with respect to boresight that the antenna might be steered to. For an isotropic one dimensional array with element-to-element distance of $d = \lambda/2$, where $\lambda$ is the wavelength of the RF radiation, Equation 1.1 becomes $$T_{imax} = i\lambda \sin\theta_M / 2c, \quad (1.2)$$

Equation 1.2 indicates that the maximum delay for $\theta_M$ is different for each of the K elements. In a similar manner, it can be shown that the delay resolution is different for each element, and is proportional to $$T_{imin} = i\lambda \sin\theta_o / 2c, \quad (1.3)$$

where $\theta_o$ is the steering angle resolution. It is worthwhile to examine an example in order to understand the rather severe delay line requirements for a one dimensional antenna. Let us assume that K=101, $\lambda=0.3$ m (i.e., L-band or f=1 GHz), $\theta_M=45^*$, and $\theta_R=0.176^*$. For this scenario and for each element we require a binary programmable fiberoptic delay line with M cascaded delay stages, where M is equal to $$M = \log_2(45/0.176) = 8 \quad (1.4)$$

It is important to note that the delay and delay resolution characteristics of the binary programmable fiberoptic delay line are different for each element. For example, for the first element we require a maximum delay of 0.35 nsec with a resolution of 1.54 psec, for the 10th element we require a maximum delay of 3.5 nsec and a resolution 15.4 psec, and for the 100th element we require 35 nsec maximum delay with 154 psec resolution.

The above discussion clearly indicates that a different binary programmable fiberoptic delay line is required for each array element. Note that a similar situation exists with 2-D antennas as well, with the hardware complexity requirement being proportional to $K^2$, where KxK are the array dimensions. This situation is obviously impractical because it may result in a large amount of hardware. This is because current and future 1- and 2-D antenna arrays with several thousand elements are rather typical which implies that several thousand different binary programmable fiberoptic delay lines would be required.

To the best of our knowledge, there has been no delay line architecture that addresses this problem. In this disclosure we present a wavelength-coded cascaded BIFODEL delay line architecture (WC-BIFODEL) that is capable of addressing K different elements while requiring $\log_2 K$, rather than K, different binary fiberoptic delay lines.

While the above-cited references and discussions are instructive, there still remains a need to provide a recirculating binary fiberoptic delay line apparatus for time steering of very large array antennas. The present invention is intended to satisfy that need.

SUMMARY OF THE INVENTION

The present invention utilizes a plurality of wavelength-coded binary fiber-optic delay lines in which the delayed microwave signal linearly modulates the intensity of a laser diode to produce an optical signal which is then routed through M number of fiber segments. Each fiber segment has a length that is equal to twice the length of its adjacent right neighbor. The length of the smallest or rightmost fiber segment is designed to introduce a delay to correspond to the desired delay resolution $T_o$. The selection of the fiber segments for routing of the signals employs M number fiber segments times a 2×2 matrix of optical switches. Each optical switch permits the signal to enter or bypass a specific optical fiber segment. Thus, by selecting the states of the switches a delay T can be imposed on the signal. The delay T can take any value in increments of $T_o$ that is equal to or less than the maximum delay value, $T_{max}$.

It is one object of the present invention, therefore to provide an improved wavelength-coded binary fiberoptic delay line apparatus.

It is another object of the present invention to provide an improved wavelength-coded binary fiberoptic delay line apparatus for time steering of array antennas.

It is still another object of the present invention to provide an improved wavelength-coded binary fiberoptic delay line apparatus wherein the output signal from a delay line is detected to intensity modulate a laser diode at a different wavelength and then applied to the next cascaded delay line.

It is yet another object of the present invention to provide an improved wavelength-coded binary fiberoptic delay line apparatus wherein wavelength coding is utilized in a fiberoptic delay line to generate a plurality of optical output delay signals.

It is still a further object of the invention to provide an improved wavelength-coded binary fiberoptic delay line apparatus wherein a very large number of optical delay signals can be generated with a small number of optic fiber segments.

These and other advantages, objects and features of the invention will become more apparent after considering the following description taken in conjunction with the illustrative embodiment in the accompanying drawing.

DESCRIPTION OF THE PREFERRED EMBODIMENT

In order to better describe the complexity of the wavelength-coded binary fiberoptic delay line (WC-BIFODEL), it is necessary to first briefly describe a simplified version of it that is appropriate for generating multiple replicas of a pulse with variable replica-to-replica delay. For the following example, assume that K delayed replicas of a pulse are to be generated, with up to R possible replica-to-replica delay values, and $T_o$ minimum delay. Furthermore, two parameters M and L are defined as:

$$M = \log_2 R \quad (2.1)$$

$$L = \log_2 K \quad (2.2)$$

where M is the number of delay stages in a binary programmable fiberoptic delay line which provides up to R different delays, and L is the number of binary programmable fiberoptic delay lines which must be used in order to generate the above replicas. In order to simplify the description, square blocks will be used to represent a binary programmable fiberoptic delay line. The parameter in the upper half of each block represents the smallest delay in the binary programmable fiberoptic delay line, whereas the parameter in the lower half of the block represents the number of delay stages.

Figure 1:
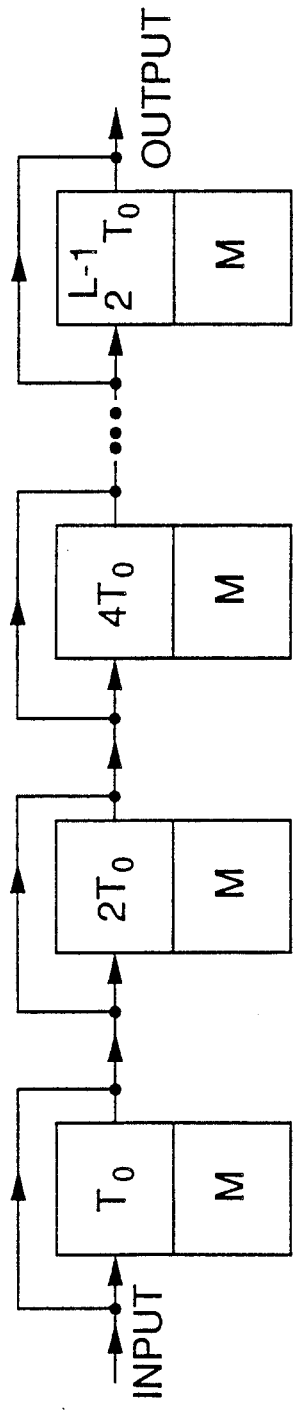
FIG. 1 is a block diagram of a cascaded binary programmable fiberoptic delay line apparatus.

Turning to FIG. 1, there is shown a block diagram of a delay line apparatus which utilizes L cascaded binary programmable fiberoptic delay lines each consisting of M delay stages. The delay resolution is different for each binary programmable fiberoptic delay line, with the ith binary programmable fiberoptic delay line's resolution being twice that of the previous one. Thus the first binary programmable fiberoptic delay line has a delay resolution $T_o$, the second $2T_o$, the third $4T_o$, ..., and the Lth $(2^{L-1})T_o$. The input signal to each binary programmable fiberoptic delay line is split into two, with one part driving the binary programmable fiberoptic delay line and the other part is added to the binary programmable fiberoptic delay line's output. Thus the output of the first binary programmable fiberoptic delay line is comprised of two pulses which are separated by a delay T. This is the delay for which the binary programmable fiberoptic delay line is programmed and which can take up to R different values. It may be noted that the same switch program is applied to all binary programmable fiberoptic delay lines, however, due to the different delay resolution each binary programmable fiberoptic delay line will introduce twice the delay of the previous one. Since the output of the first binary programmable fiberoptic delay line is applied to both the input and output of the second binary programmable fiberoptic delay line, at the output of the second binary programmable fiberoptic delay line there will be found four pulses located at times 0, T, 2T, and 3T respectively. The first two replicas are due to the propagation of the input signal through the zero delay path, whereas the second two pulses are due to the propagation of the input signal through the second binary programmable fiberoptic delay line. Thus the second binary programmable fiberoptic delay line doubles the number of the input pulses while it maintains the intrapulse delay. Similarly, at the output of the third binary programmable fiberoptic delay line we find eight pulses spaced by T time apart will be found. Once again, the first four pulses are due to the 0 delay path propagation and whereas the second four are due to the propagation of the input signal through the third binary programmable fiberoptic delay line. This situation continues and every time the data are entered to a new binary programmable fiberoptic delay line the number of pulses doubles but the intrapulse time spacing remains the same as that set at the first binary programmable fiberoptic delay line. Thus, since there is total of L binary programmable fiberoptic delay lines, there can be produced a total of $2^L$ pules, with the actual number being variable since it is always possible to bypass one or more binary programmable fiberoptic delay lines if so desired. Note however that in the latter case the output pulses will appear in various groups with various intragroup delays, however, within any group the intrapulse delay will be the same. The exact values of these delays will depend on the switch settings as well as the number and/or locations of the bypassed binary programmable fiberoptic delay lines. This situation becomes more complicated if the binary programmable fiberoptic delay lines' delay resolution settings change to a different arrangement.

It should be obvious that the architecture of FIG. 1 is very powerful with its power lying in the fact that the required hardware increases in a $\log_2$ relation with both the number of pulses K and the number of delays R. Thus, if 1024 pulses need to be generated with 1024 possible intrapulse delays, only 10 cascaded binary programmable fiberoptic delay lines each with 10 delay stages would be required.

Consider now the case where a typical radar signal is used as the input signal. Under the assumption that L binary programmable fiberoptic delay lines are used, it can be shown that the output signal consists of $2^L$ overlapping such signals that are delayed with respect to each other. The delays do obey the pulse delay rules described above. Regarding the above output it must be noted that it does contain all the necessary information for steering a $2^L$ element one dimensional antenna array. Unfortunately, there is no obvious way to separate the above delayed signals and thus, it is necessary to employ an encoding scheme which uniquely specifies each of the delay signal replicas.

Figure 2:
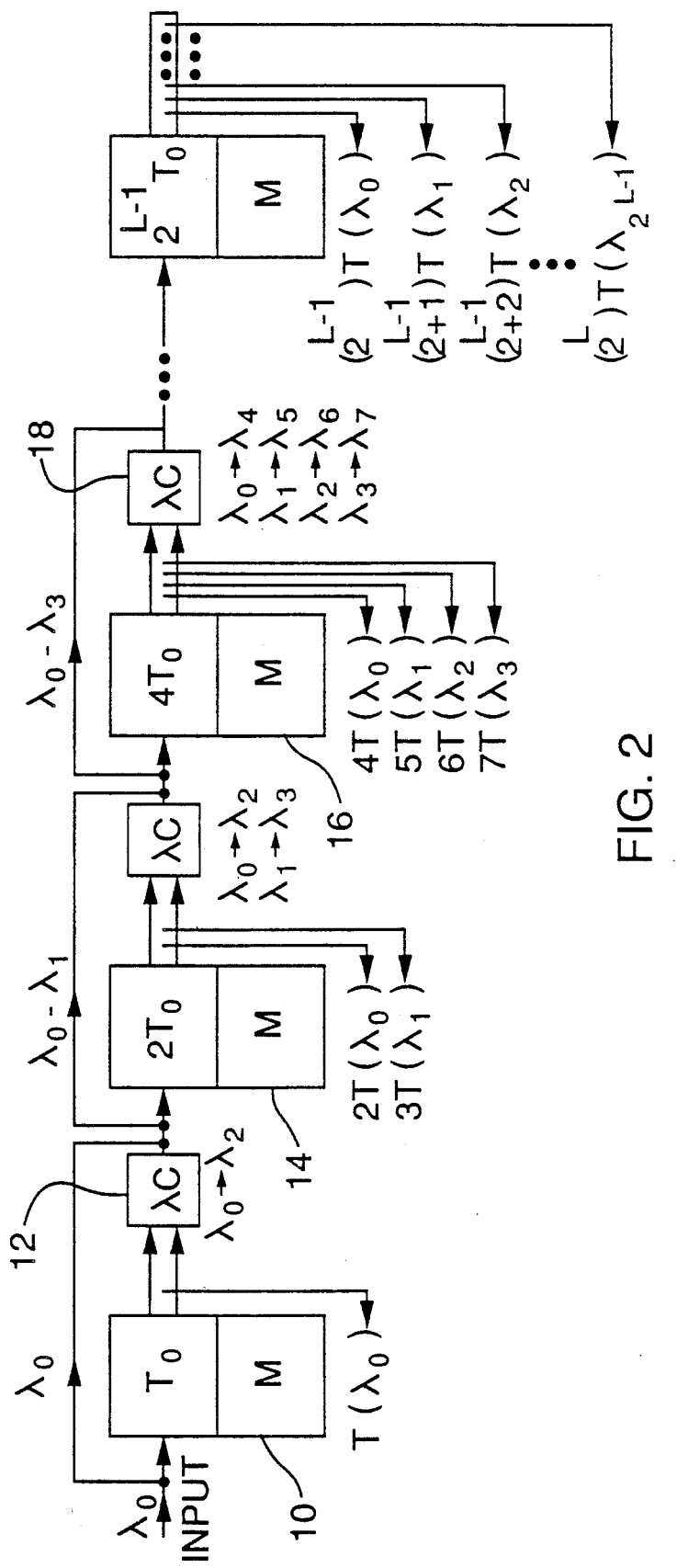
FIG. 2 is a block diagram of a wavelength-coded binary programmable fiberoptic delay line apparatus according to the present invention.

The present invention describes an encoding technique that is well suited to solve the above problem. The signal to be delayed is encoded in terms of optical wavelength. The basic idea is as follows: the output of each binary programmable fiberoptic delay line is detected and separated into a number of optical wavelengths that have been applied at the binary programmable fiberoptic delay line's input. Each of these wavelengths are then converted to a new wavelength that has not been used earlier. Referring now to FIG. 2, there is shown a block diagram of a wavelength-coded binary programmable fiberoptic delay line apparatus. Once again L cascaded binary programmable fiberoptic delay lines are used, with each binary programmable fiberoptic delay line's delay resolution being twice that of the left neighbor. All the binary programmable fiberoptic delay lines have the same switch program. The signal to be replicated is applied at the input and the output of to the first binary programmable fiberoptic delay line unit 10 and is being encoded on wavelength $\lambda_o$. Assuming the binary programmable fiberoptic delay line unit 10 is set for delay T, it may be seen that the output consists of one signal replica that is delayed by an amount T and is at wavelength $\lambda_o$. The signal contains all the information necessary to drive the first antenna element. Part of this signal is detected and converted from $\lambda_o$ to $\lambda_1$ in a detector/converter unit ($\lambda$C) 12. The detection is performed using a standard photodetector whose output is used to modulate the intensity of a laser diode at $\lambda_1$. This signal is then added to the zero delay signal, i.e., the original input at wavelength $\lambda_o$, and consequently applied to both the input and the output of the second binary programmable fiberoptic delay line unit 14. The output of binary programmable fiberoptic delay line unit 14 is comprised of delayed signals that are on two wavelengths. These signals are detected and separated according to their wavelength.

The signal at wavelength $\lambda_o$ is a version of the original signal delayed by an amount 2T and is thus appropriate for addressing the second antenna element. The signal at $\lambda_1$ has a total delay of 3T (i.e., T from the first binary programmable fiberoptic delay line unit 10 plus 2T from the second) and is thus appropriate for addresing the third antenna element. Part of these signals is then converted to a different wavelength, e.g., $\lambda_o$ to $\lambda_2$, and $\lambda_1$ to $\lambda_3$. The resulting signals are added to the signal which is applied to the input of the second binary programmable fiberoptic delay line unit 14 and are subsequently applied to both the input and output of the third binary programmable fiberoptic delay line unit 16. At the output of the third binary programmable fiberoptic delay line unit 16 there are now four progressively delayed by (4T-7T) versions of the original signal each at a different wavelength $\lambda_o$-$\lambda_3$. The output optical signal is separated according to wavelengths, and part of them is then used to drive the fourth, fifth, sixth and seventh antenna elements which require delays 4T, 5T, 6T and 7T respectively. The other parts which are converted, as before, in a detector/converter unit 18, to four new wavelengths $\lambda_4$-$\lambda_7$, are then applied to the fourth binary programmable fiberoptic delay line unit, . . ., etc. This situation continues until the last, $2^{L-1}$th, binary programmable fiberoptic delay line unit at the output of which there will be a total of $2^{L-1}$ different wavelengths which carry the delayed signals required to drive the last K/2 antenna elements. Note that wavelength conversion is utilized to separate the information that is due to the zero delay path and the delay information which is due to the binary programmable fiberoptic delay line path. This is caused by the fact that the same signal is applied to both the input and the output of each binary programmable fiberoptic delay line. Also note that at the output of the ith binary programmable fiberoptic delay line there will be i wavelengths each of which carries a delayed version of the input signal, with the delays being equal to iT, (i+1)T, . . . , (2i-1)T.

The Qth wavelength-coded binary programmable fiberoptic delay line unit requires a 1:2 optical power splitter, a 1:Q optical demultiplexer (to separate the wavelengths), a Q:1 optical multiplexer (to add the different wavelengths), and Q wavelength converters. The number of channels required by each of the last three components is proportional to Q which is related to i via a base-2 exponential function.

From the above discussions, the total number of the various components required by a wavelength-coded binary programmable fiberoptic delay line to generate up to K delays may be calculated. The number L of binary programmable fiberoptic delay lines and the number of splitters, multiplexers and demultiplexers is given Equation 2.2. The largest demultiplexer channel capacity is required by the demultiplexer located at the output of the Lth (last) unit and is equal to $2^{L-1}$ (i.e., K/2). The largest multiplexer channel capacity is required by the multiplexer located at the output of the (L−1)th binary programmable fiberoptic delay line and is also equal to $2^{L-1}$ (i e., K/2). Similarly, the total number of different wavelengths required is equal to $2^{L-1}$ (i.e., K/2), whereas the total number of wavelength converters is equal to K. It is thus clear that the limiting factor in the length (or maximum K) of the wavelength-coded binary fiberoptic delay line (WC-BIFODEL) cascade is the complexity of the peripheral components rather than the number of binary programmable fiberoptic delay lines. This is shown quantitatively in Table 1 which shows the various hardware requirements as a function of the number of delays K.

TABLE 1

WC-BIFODEL HARDWARE COMPLEXITY AND SAVINGS AS A FUNCTION OF THE NUMBER OF DELAYS K

| K | BIFODELs-DEMUX MUX REQUIRED | BIFODEL SAVINGS PERCENTAGE | DEMUX-MUX-$\lambda$ CHANNELS |
|---|---|---|---|
| 8 | 3 | 63 | 4 |
| 16 | 4 | 75 | 8 |
| 32 | 5 | 84 | 16 |
| 64 | 6 | 91 | 32 |
| 128 | 7 | 95 | 64 |

The above data indicate that with state-of-the-art components, e.g., 32-64 channel multiplexers/demultiplexers (MUXs/DEMUXs), the wavelength-coded binary fiberoptic delay line does achieve about an order of magnitude hardware savings which is clearly a very significant figure. It should be noted that for radar scenarios where multiple independent beams are used, the typical figure for the minimum number of antenna elements per radar beam is in the 32-64 range which matches very well the capabilities of the wavelength-coded binary fiberoptic delay line.

In conclusion, it may be seen that the wavelength-coded binary fiberoptic delay line is indeed an efficient one dimensional linear delay line architecture and when used in conjunction with array antennas will result in binary programmable fiberoptic delay line savings of at least an order of magnitude over that of the conventional approach which requires K binary programmable fiberoptic delay lines.

Although the invention has been described with reference to a particular embodiment, it will be understood to those skilled in the art that the invention is capable of a variety of alternative embodiments within the spirit and scope of the appended claims.

What is claimed is:

1. A wavelength-coded binary fiberoptic delay line apparatus for time steering of array antennas comprising in combination:

a plurality of delay line units respectively cascaded to each other to receive an input signal from a previous stage and to provide an output signal to a following stage, each delay line unit of said plurality of delay line units respectively providing a predetermined time delay and comprising a predetermined number of delay stages, the input signal to each delay line unit is split into two parts, with one part driving the delay line unit and the second part added to the output of the delay line unit, wherein, the output of the first delay line unit comprises two signals which are separated by the time delay of said first delay line unit, each delay line unit in said plurality of delay line units respectively function in the same manner as said first delay line unit except each respective delay line unit doubles the number of output signals while it maintains the intrapulse time delay, and a plurality of detecting/converting units for receiving a first signal at a first wavelength and converting it to a second signal at a second wavelength, each detecting/converting unit of said plurality of detecting/converting units respectively connected between adjacent delay line units of said plurality of delay line units, each delay line unit respectively providing delay output signals.

2. A wavelength-coded binary fiberoptic delay line apparatus as described in claim 1 wherein said plurality of delay lines respectively comprise a binary fiberoptic delay line.

3. A wavelength-coded binary fiberoptic delay line apparatus as described in claim 1 wherein said plurality of detecting/converting units respectively comprise a photodetector in combination with a laser diode which operates at a wavelength that is different from the wavelength of the signal input.

4. A wavelength-coded binary fiberoptic delay line apparatus as described in claim 1 wherein said predetermined time delay in each delay line unit respectively increases by a factor of two between the first delay line unit and the last delay line unit.

5. A wavelength-coded binary fiberoptic delay line apparatus as described in claim 1 wherein said predetermined delay stages for each delay line unit of said plurality of delay line units are equal.

* * * * *